United States Patent [19]
Wincn

[11] Patent Number: 5,568,515
[45] Date of Patent: Oct. 22, 1996

[54] REVERSIBLE AUI PORT FOR ETHERNET

[75] Inventor: John M. Wincn, Cupertino, Calif.

[73] Assignee: Advanced Micro Devices Inc., Sunnyvale, Calif.

[21] Appl. No.: 441,831

[22] Filed: May 16, 1995

Related U.S. Application Data

[63] Continuation of Ser. No. 391,912, Feb. 21, 1995.

[51] Int. Cl.$^6$ ........................................ H04B 3/00
[52] U.S. Cl. ................... 375/257; 326/82; 327/108
[58] Field of Search .................. 375/257; 327/108, 327/109; 370/85.1, 85.3; 326/31, 82; 330/252

[56] References Cited

U.S. PATENT DOCUMENTS

| | | | |
|---|---|---|---|
| 4,760,282 | 7/1988 | Kuo et al. | 326/90 |
| 4,884,165 | 11/1989 | Kong et al. | 326/90 |
| 5,164,960 | 11/1992 | Vijeh et al. | 375/377 |
| 5,263,049 | 11/1993 | Wincn et al. | 375/257 |
| 5,327,465 | 7/1994 | Wincn et al. | 375/351 |

*Primary Examiner*—Tesfaldet Bocure
*Attorney, Agent, or Firm*—Townsend and Townsend and Crew LLP

[57] ABSTRACT

An improved AUI (CI) line driver that implements three modes: an active mode, an idle mode, and a reverse mode. The reverse mode allows use of the AUI line driver cell in a reversible AUI, that is, in an AUI that can be reconfigured for controller mode, or transceiver mode. The controller mode AUI has two AUI receivers and an AUI driver, while the transceiver mode has two AUI drivers and an AUI receiver. Having one driver cell (the CI cell) that can be reversed permits reconfiguring the AUI into either mode.

5 Claims, 3 Drawing Sheets

REVERSIBLE AUI PORT FOR ETHERNET

CROSS-REFERENCE TO RELATED APPLICATIONS

This application is a continuation of "REVERSIBLE AUI PORT FOR ETHERNET," U.S. patent application Ser. No. 08/391,912, filed Feb. 21, 1995, now pending. This application is related to "TWISTED PAIR MEDIUM ACCESS UNIT," U.S. patent application Ser. No. 08/224,946, now issued as U.S. Pat. No. 5,467,369 on Nov. 14, 1995, which is a Divisional of "METHOD AND APPARATUS FOR SQUELCH CIRCUIT IN NETWORK COMMUNICATION," Ser. No. 07/899,083, now issued as U.S. Pat. No. 5,327,465 on Jul. 5,1994, which is a Divisional of "MEDIUM ATTACHMENT UNIT FOR USE WITH TWISTED PAIR LOCAL AREA NETWORK," U.S. Pat. No. 5,164,960, and is related to "METHOD AND APPARATUS FOR CMOS DIFFERENTIAL DRIVE HAVING A RAPID TURN OFF," U.S. Pat. No. 5,263,049, which is also a Divisional of "MEDIUM ATTACHMENT UNIT FOR USE WITH TWISTED PAIR LOCAL AREA NETWORK," U.S. Pat. No. 5,164,960, all hereby expressly incorporated by reference for all purposes.

BACKGROUND OF THE INVENTION

The present invention relates generally to Local Area Networks ("LANS") and more specifically to an improved attachment unit interface (AUI) for implementation of communication protocols in a LAN system.

The incorporated patents and patent applications describe a set of inventions that relate to devices that facilitate implementation of local area networks. It is one aspect of those disclosures to describe implementation of various IEEE standards, including 802.3 and 10 Base T, both hereby expressly incorporated by reference for all purposes. These documents include a description of an attachment unit interface (AUI) used in one common implementation of a carrier sense, multiple access/collision detection (CSMA/CD) network protocol. One common implementation of this CSMA/CD protocol is the well-known ETHERNET protocol.

FIG. 1 illustrates one common implementation of a typical AUI 10 to communicate between a repeater data terminal equipment (DTE) 12 implemented as part of a repeater 14, for example, and a transceiver DTE 16, implemented as part of a medium attachment unit (MAU) 18, for example. As illustrated, AUI 10 traditionally includes three differential signals, a Data Out (DO), a Data In (DI), and a Control In (CI). An AUI driver 30 transmits one differential signal to an AUI receiver 32.

Repeater DTE 12 has one AUI driver 30 and two AUI receivers 32. MAU DTE 16 has two AUI drivers 30 and one AUI receiver 32. The AUI driver illustrated in the incorporated patents and patent application satisfactorily implements the necessary communications and signalling functions as described in detail therein.

FIG. 2 is an illustration of an AUI driver cell 100 described in detail in the incorporated references. Driver cell 100 includes a controller 102 for controlling a pair of MOS current drivers (transistors $Q_1$–$Q_4$), an end-of-transmission delimiter (ETD) transistor $Q_5$, and a terminating resistor R. Controller 102 includes appropriate logic structures to implement the logic function illustrated by Table I below.

TABLE I

| $SI^+$ | $SI^-$ | MNCV | W | X | Y | Z | N | $TR^+$ | $TR^-$ |
|---|---|---|---|---|---|---|---|---|---|
| 1 | 0 | 1 | 1 | 0 | 1 | 0 | 1 | 1 | 0 |
| 0 | 1 | 1 | 0 | 1 | 0 | 1 | 1 | 0 | 1 |
| 1 | 0 | 0 | 0 | 0 | 1 | 1 | 0 | * | * |
| 0 | 1 | 0 | 0 | 0 | 1 | 1 | 0 | * | * |

*Termination of ETD, all transistors are on.

AUI driver cell 100 may be integrated into a semiconductor device defining repeater 14 or MAU 18. Thus, repeater 14 includes a single AUI line driver cell 100 for each AUI 10. Due to proliferation of network management tools, it may be desirable in some instances to have use of a MAU DTE in repeater 14. A simple, but inefficient solution would be to simply provide for two AUI 10, one configured for a MAU DTE and one configured for a repeater DTE, each having six pins. In some implementations, there can be twelve AUI 10 per repeater 14, resulting in a requirement for an extra seventy-two pins if every port were to be reconfigurable.

It is an object of the present invention to provide a more efficient solution to the problem of permitting a reconfiguration of a MAU DTE to a repeater DTE, and vice-versa.

SUMMARY OF THE INVENTION

The present invention provides apparatus and method for simply, efficiently and economically providing for a reversible AUI in a network environment. By providing a driver cell according to the present invention, a reversible interface is possible.

Noting that each implementation of a DTE always has at least one driver and one receiver, it is the configuration of the remaining interface cell that is important. Sometimes that cell is a receiver, and sometimes that cell is a driver. Therefore, a reversible AUI may be provided by dynamically allocating the DATA IN/OUT cells for use in the appropriate implementation. That is, when using a reconfigurable DTE, a AUI receiver cell is used as either DATA OUT or DATA IN, and one AUI driver cell is used for the other function. Such a system requires that the AUI cell used for the collision cell operates sometimes as a receive cell and sometimes as a drive cell, depending upon the configuration. The present invention provides for an AUI line driver that is reversible, allowing a cell incorporating the invention to function properly as a driver when in a MAU DTE, and to not interfere with operation when the cell is configured in a repeater DTE as a receiver.

According to one aspect of the invention, it includes two current drivers, and a controller, coupled to the drivers, that is responsive to an input differential signal ($SI^+$ and $SI^-$), a manchester valid (MNCV) signal, and a reverse enable (REV_EN) signal, for controlling the current drivers. When the REV_EN signal is deasserted, the controller operates the current drivers like controller 102 shown in FIG. 2. That is, the current drivers are either in an active mode, driving output terminals responsive to the input differential signal, or in an idle mode, in which all of the transistors of the current drivers are on.

However, when the REV_EN signal is asserted, all the current drivers are turned off. Thus, the AUI line driver of the present invention has three modes of operation: an active mode, an idle mode, and a reverse mode. For customization by a user, the terminating resistor R that had been integrated with the preferred embodiment of the previous AUI line driver cell has been removed, allowing use of an external terminating resistance R selected for the particular application.

Reference to the remaining portions of the specification, including the drawing and claims, will realize other features and advantages of the present invention. Further features and advantages of the present invention, as well as the structure and operation of various embodiments of the present invention, are described in detail below with respect to accompanying drawing. In the drawing, like reference numbers indicate identical or functionally similar elements.

DESCRIPTION OF THE PREFERRED EMBODIMENT

Figure 3:
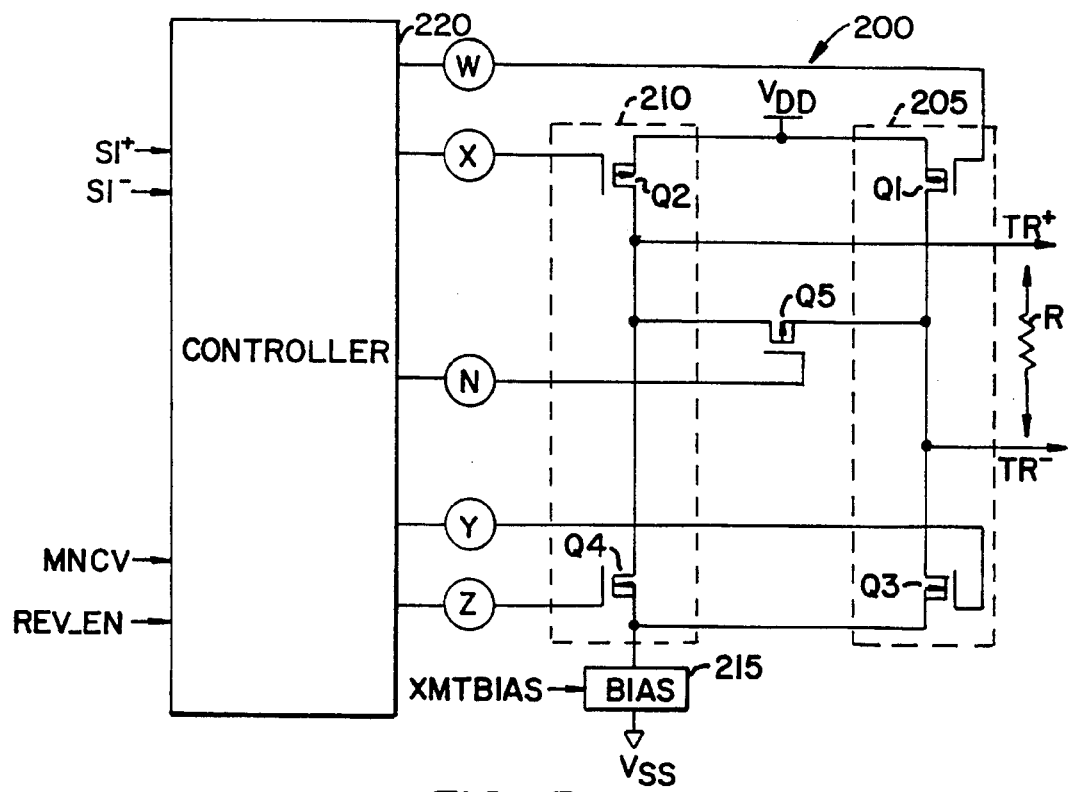
FIG. 3 is a schematic block diagram of a reversible AUI line driver cell according to the present invention.

FIG. 3 is a schematic block diagram of a reversible AUI line driver cell 200 according to the present invention. AUI driver cell 200 includes two current drivers (205 and 210), an end-of-transmission delimiter (ETD) controlling transistor $Q_5$, a bias control 215, and a controller 220.

The current drivers, in the preferred embodiment, each include two metal oxide semiconductor (MOS) transistors. One MOS transistor of each pair of MOS transistors is a p-channel MOS (PMOS) transistor and the other is an n-channel MOS (NMOS) transistor. Current driver 205 includes PMOS transistor $Q_1$ and NMOS transistor $Q_3$, and current driver 210 includes PMOS transistor $Q_2$ and NMOS transistor $Q_4$.

In each current driver, a drain of the PMOS transistor is coupled to a drain of the NMOS transistor. A source of the PMOS transistor is coupled to a first reference voltage $V_{DD}$. A source Of the NMOS transistor is coupled to an input of bias control 215. Output terminals coupled to the drains of the transistors in the current drivers provide the output differential signal. The drains of the transistors in current driver 210 provide $TR_{POS}$ and the drains of the transistors in current driver 205 provide $TR_{NEG}$.

Bias control 215 has a reference terminal coupled to a second reference voltage $V_{SS}$ and a control input responsive to a transmit bias control (XMTBIAS) signal. When XMTBIAS is asserted, current driver 205 and current driver 210 are enabled. Deassertion of the XMTBIAS signal disables the current drivers.

ETD transistor Q5 is a PMOS transistor having a drain coupled to one of the output terminals, and a source coupled to the other output terminal.

For reference purposes, five control nodes, W, X, Y, Z, and N, are illustrated as representing control values of gates of $Q_1$, $Q_2$, $Q_3$, $Q_4$, and $Q_5$, respectively. Controller 220 controls the current drivers by setting the control voltages of the control nodes, responsive to three input signals: a differential input signal (Signal In (positive) $SI^+$ and Signal In (negative) $SI^-$), a manchester valid (MNCV) signal, and a REV_EN signal. Table II represents a truth table implemented by the preferred embodiment of controller 220.

TABLE II

| SI+ | SI- | MNCV | REV_EN | W | X | Y | Z | N | TR+ | TR- |
|---|---|---|---|---|---|---|---|---|---|---|
| 1 | 0 | 1 | 1 | 1 | 0 | 1 | 0 | 1 | 1 | 0 |
| 0 | 1 | 1 | 1 | 0 | 1 | 0 | 1 | 1 | 0 | 1 |
| 1 | 0 | 0 | 1 | 0 | 0 | 1 | 1 | 0 | * | * |
| 0 | 1 | 0 | 1 | 0 | 0 | 1 | 1 | 0 | * | * |
| 1 | 0 | 1 | 0 | 1 | 1 | 0 | 0 | 1 | † | † |
| 0 | 1 | 1 | 0 | 1 | 1 | 0 | 0 | 1 | † | † |
| 1 | 0 | 0 | 0 | 1 | 1 | 0 | 0 | 1 | † | † |
| 0 | 1 | 0 | 0 | 1 | 1 | 0 | 0 | 1 | † | † |

*Termination of ETD, all transistors $Q_1$–$Q_5$ are on.
†Receive mode, all transistors are off (outputs float).

Figure 1:
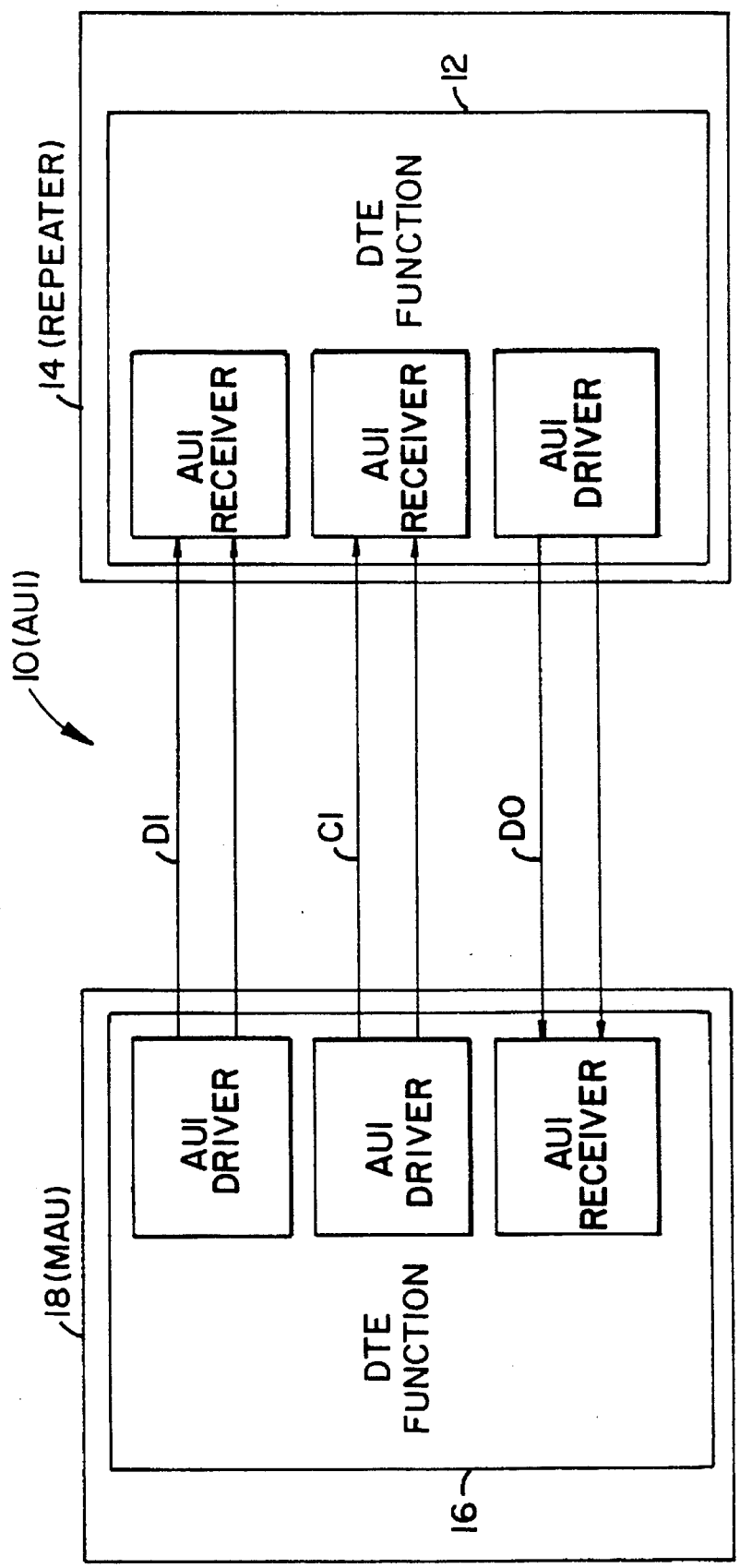
FIG. 1 illustrates one common implementation of a typical AUI to communicate between a repeater data terminal equipment (DTE) implemented as part of a repeater, for example, and a transceiver DTE, implemented as part of a medium attachment unit (MAU), for example.
Figure 2:
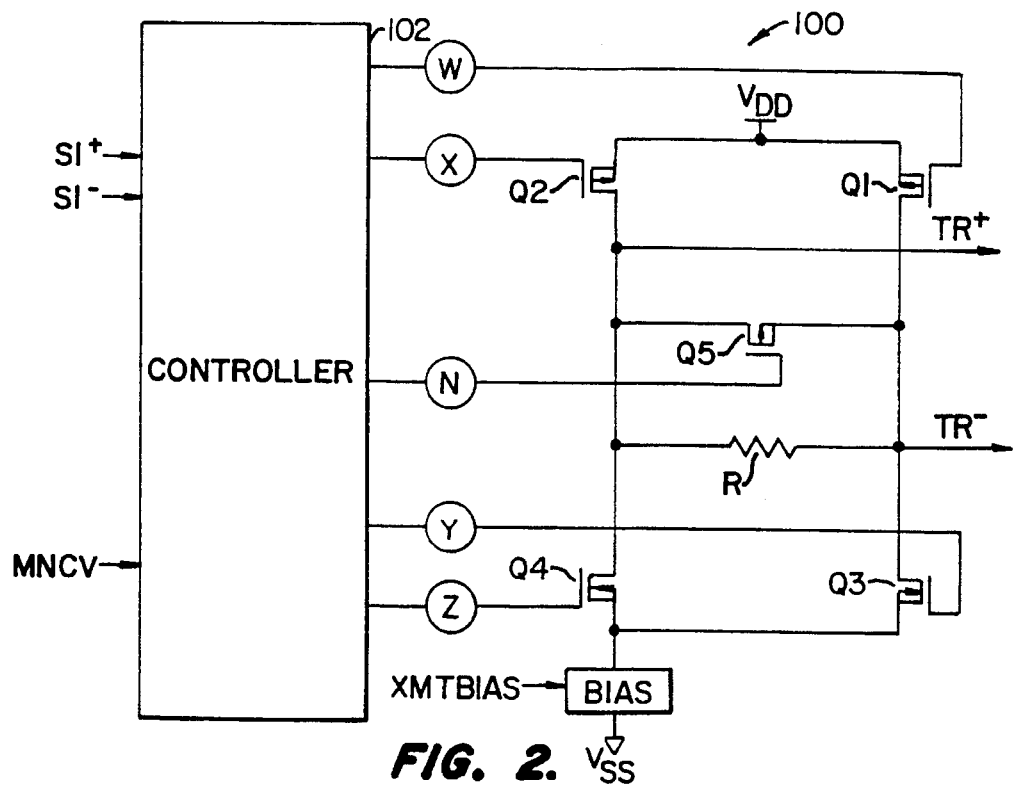
FIG. 2 is an illustration of an AUI driver cell described in detail in the incorporated references.

Review of Table II reveals that controller 220 operates like the AUI line driver cell shown in FIG. 2 when REV_EN is asserted. However, deasserting the REV_EN signal results in floating the outputs of line driver 200 because all the transistors $Q_1$–$Q_5$ are turned off.

Figure 4:
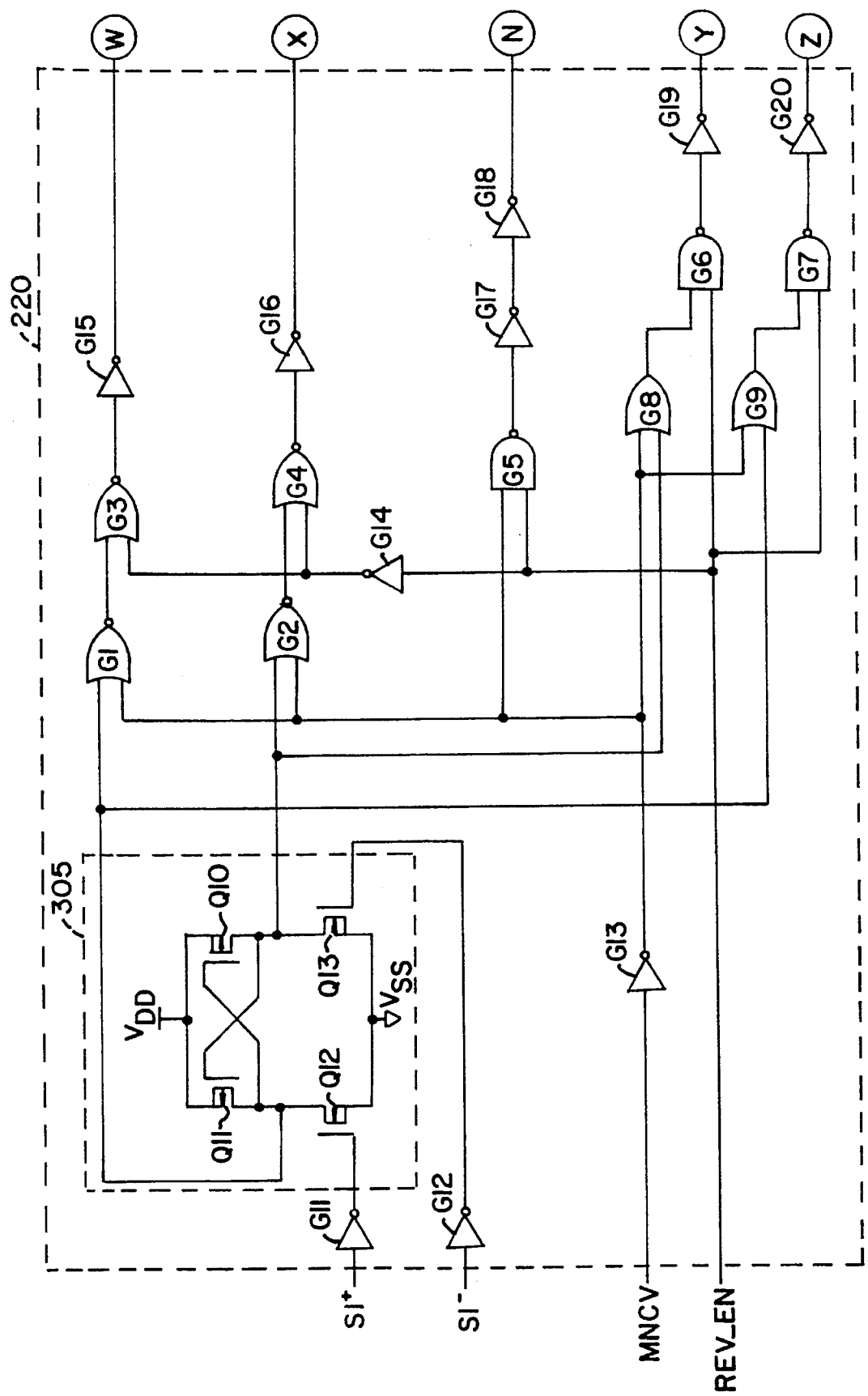
FIG. 4 is a detailed schematic diagram of a preferred embodiment of the present invention.

FIG. 4 is a detailed schematic diagram of a preferred embodiment for controller 220 according to the present invention. As noted above, controller 220 implements the logic function shown in Table II. The components illustrated in FIG. 4 are representative of the use of combinatorial logic to implement the logic function described in Table II. As well understood in the art, other implementations are possible.

As shown, controller 220 includes a cross-coupled latch 305, four dual-input NOR gates (G1–G4), three dual-input NAND gates (G5–G7), two dual-input OR gates (G8 and G9), and ten inverters (G11–G20).

Cross-coupled latch 305 is implemented with four MOS transistors (Q10–Q13). Transistor Q10 and transistor Q11 are PMOS transistors, each having a source coupled to a first reference voltage $V_{DD}$. Transistor Q12 and Q13 are NMOS transistors, each having a source coupled to a second reference voltage $V_{SS}$. A drain of transistor Q11 is coupled to a drain of transistor Q12, providing a first differential output node. Similarly, a drain of transistor Q10 is coupled to a drain of transistor Q13, providing a second differential output node. A gate of transistor Q10 is coupled to the first output node, and a gate of transistor Q11 is coupled to the second output node. A gate of transistor Q12 provides a first differential input, and a gate of transistor Q13 provides a second differential input.

Inverter G11 has an input for receiving the SI+ input signal, and an output coupled to the first differential input. Inverter G12 has an input for receiving the SI– input signal, and an output coupled to the second differential input. The first output node is coupled to a first input of NOR gate G1 and to a first input of OR gate G9. The second output node is coupled to a first input of OR gate G2 and to a first input of OR gate G8.

Inverter G13 has an input for receiving the MNCV signal, and an output coupled to a second input of NOR gate G1, a second input of NOR gate G2, a first input of NAND gate G5, a second input of OR gate G8, and a second input of OR gate G9.

A second input of NAND gate G5, a first input of NAND gate G6 and a first input of NAND gate G7 each receive the REV_EN signal. Additionally, inverter G14 has an input for receiving the REV_EN signal, and an output coupled to a first input of NOR gate G3 and a first input of NOR gate G4.

An output of NOR gate G1 is coupled to a second input of NOR gate G3, wherein an output of NOR gate G3 is coupled to an input of inverter G15. An output of inverter G15 provides the binary control voltage for reference node W referenced in Table II above.

An output of NOR gate G2 is coupled to a second input of NOR gate G4, wherein an output of NOR gate G4 is coupled to an input of inverter G16. An output of inverter G16 provides the binary control voltage for reference node X referenced in Table II above.

An output of OR gate G8 is coupled to a second input of NAND gate G6, wherein an output of NAND gate G6 is coupled to an input of inverter G19. An output of inverter G19 provides the binary control voltage for reference node Y referenced in Table II above.

An output of OR gate G9 is coupled to a second input of NAND gate G7, wherein an output of NAND gate G7 is coupled to an input of inverter G20. An output of inverter G20 provides the binary control voltage for reference node Z referenced in Table II above.

An output of NAND gate G5 is coupled to an input of inverter G17, wherein an output of inverter G17 is coupled to an input of inverter G18. An output of inverter G18 provides the binary control voltage for reference node N referenced in Table II above.

In conclusion, the present invention provides a simple, efficient solution to a problem of reconfiguring an AUI. Use of an AUI line driver cell implementing the present invention permits a reconfigurable AUI, allowing a MAU DTE to be configured as a repeater DTE, for example, without addition of extra pins. While the above is a complete description of the preferred embodiments of the invention, various alternatives, modifications, and equivalents may be used. As noted in the incorporated patent disclosures, the use of the ETD controlling transistor Q5 improves the performance of the AUI line driver. In some implementations, it may be desirable to eliminate transistor Q5 from the AUI line driver cell. It is possible to do so without departing from the scope of the present invention. Other modifications are possible. For example, the preferred embodiment contemplates an AUI driver cell having a reverse mode that offers high impedance for a receive mode in addition to an idle mode and an active mode. The preferred embodiment is useful for transforming a hub DTE function to a transceiver DTE function by changing the CI driver cell in the two DTE functions. This switching of a DTE function mode is not contemplated to be on-the-fly, though other embodiments may provide for dynamic switching. Therefore, the above description should not be taken as limiting the scope of the invention which is defined by the appended claims.

What is claimed is:

1. A reversible Control In line driver, comprising:

a first and a second current driver, each current driver coupled between a first reference voltage and a second reference voltage, for driving a differential output signal on a first output and a second output, wherein said first output is coupled to said first current driver and said second output is coupled to said second current driver; and a differential driver, coupled to said current drivers and responsive to an input differential signal, a transmit signal, and a REV_EN signal, for:

driving said output differential signal from said outputs responsive to said input differential signal when said transmit signal is asserted and said REV_EN signal is deasserted, otherwise activating each said current driver when said transmit signal and said REV_EN signal are deasserted; and otherwise deactivating each current driver when said REV_EN signal is asserted.

2. The reversible Control In line driver of claim 1 wherein each current driver comprises a PMOS transistor and an NMOS transistor, wherein a drain of said PMOS transistor is coupled to a drain of said NMOS transistor, a source of said NMOS transistor is coupled to said first reference voltage, and a source of said PMOS transistor is coupled to said second reference voltage; and wherein said first output is coupled to said drain of said PMOS transistor of said first current driver and said second output is coupled to said drain of said PMOS transistor of said second current driver.

3. The reversible differential line driver of claim 2 wherein said current drivers and said differential driver are integrated into a semiconductor package.

4. The reversible differential line driver of claim 3 further comprising a terminating impedance coupled across said first and second outputs wherein said terminating impedance is not integrated into said semiconductor package.

5. A reversible Control In line driver, comprising:

a first and a second MOS driver, each MOS driver comprising a PMOS transistor and an NMOS transistor, a drain of said PMOS transistor coupled to a drain of said NMOS transistor, a source of said NMOS transistor coupled to a first reference voltage, and a source of said PMOS transistor coupled to a second reference voltage;

a first output coupled to said drain of said NMOS transistor of said first MOS driver;

a second output coupled to said drain of said NMOS transistor of said second MOS driver; and a driver controller, coupled to a gate of each transistor of said MOS drivers and responsive to an input differential signal, a transmit signal, and a REV_EN signal, for:

driving an output differential signal from said outputs responsive to said input differential signal when said transmit signal is asserted and said REV_EN signal is deasserted, otherwise activating each transistor of said MOS drivers when said transmit signal and said REV_En signal are deasserted; and otherwise deactivating each transistor of said MOS drivers when said REV_EN signal is asserted.

* * * * *